April 23, 1957     H. A. SCHOFIELD     2,789,702
MEANS FOR CLAMPING A SHELF TO A SUPPORT
IN FURNITURE MANUFACTURING
Filed March 15, 1955     2 Sheets-Sheet 1
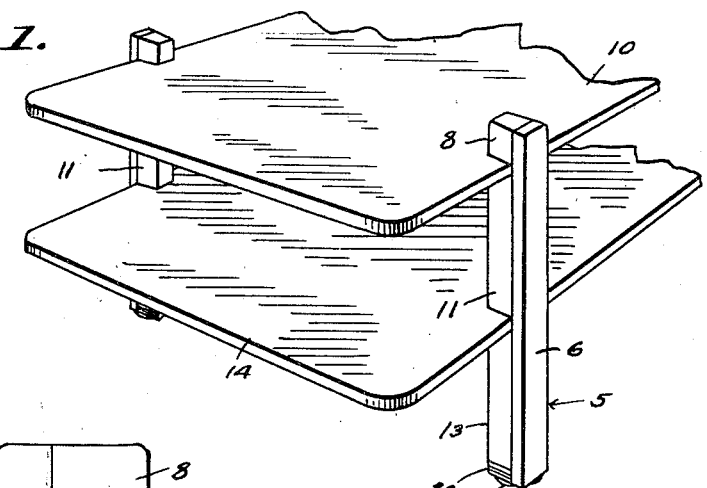
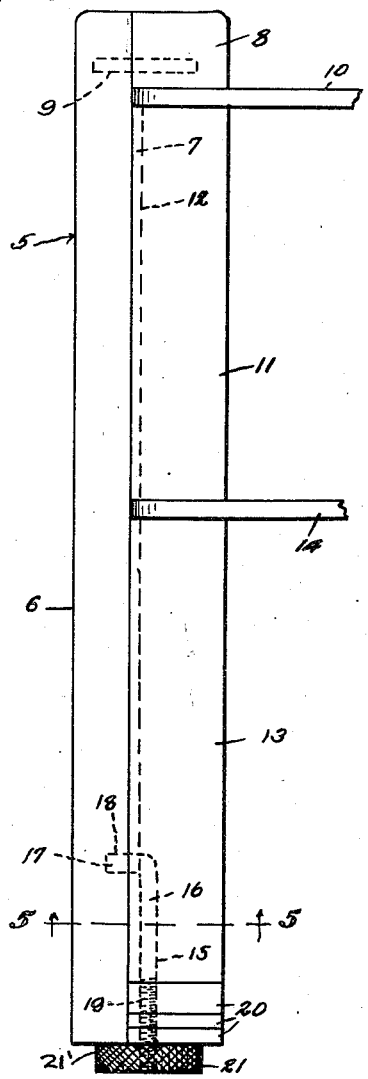
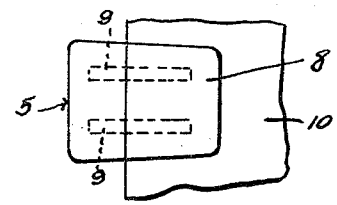
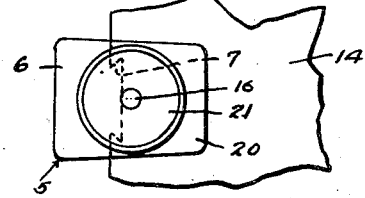
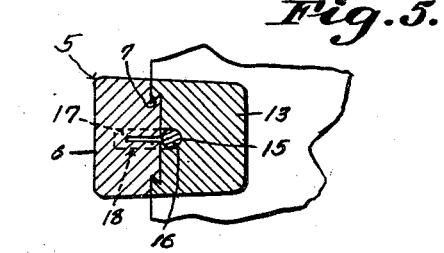
Hazen A. Schofield
INVENTOR
BY *CA Snow & Co.*
ATTORNEYS.

April 23, 1957 H. A. SCHOFIELD 2,789,702
MEANS FOR CLAMPING A SHELF TO A SUPPORT
IN FURNITURE MANUFACTURING
Filed March 15, 1955 2 Sheets-Sheet 2
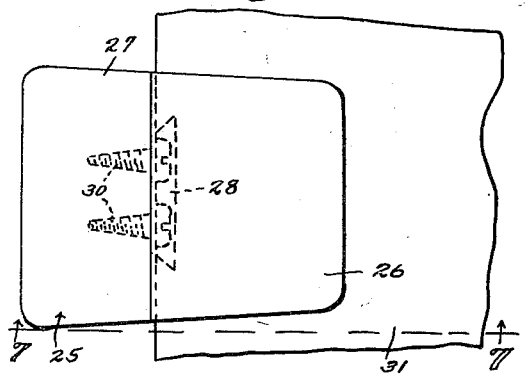
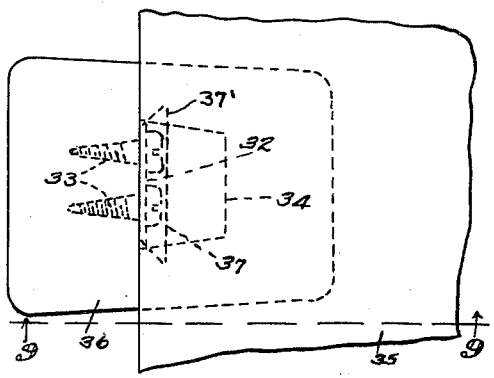
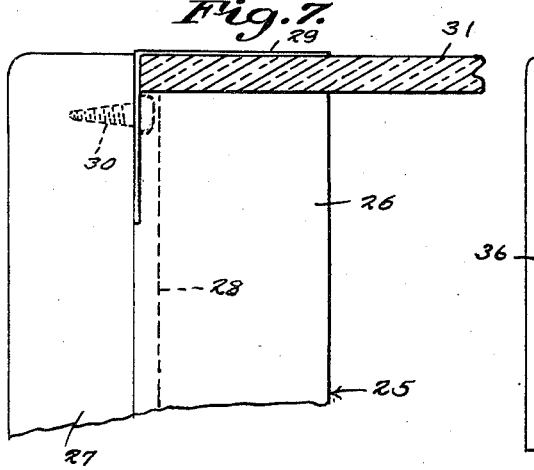
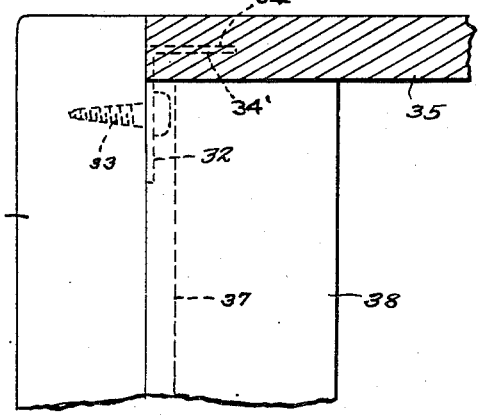
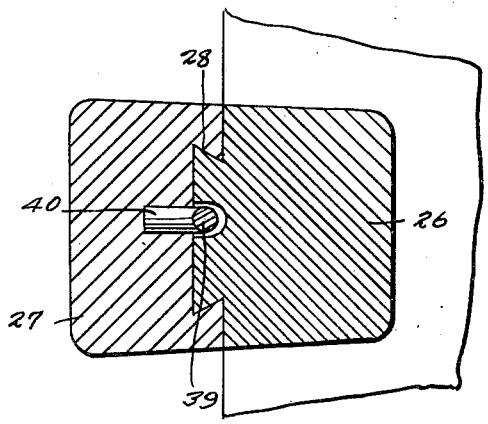
Hazen A. Schofield
INVENTOR
BY
ATTORNEYS.

United States Patent Office 2,789,702
Patented Apr. 23, 1957

2,789,702

MEANS FOR CLAMPING A SHELF TO A SUPPORT IN FURNITURE MANUFACTURING

Hazen A. Schofield, Dallas, Tex.

Application March 15, 1955, Serial No. 494,507

1 Claim. (Cl. 211—148)

This invention relates to furniture construction, such as tables or the like and wherein shelves or table tops are removably connected to their supporting legs or supporting members.

An important object of the invention is to provide a support for shelving wherein the support is in the form of table legs having shelf clamping means including an adjustable rod mounted in a bore disposed along the longitudinal axis of the leg, the rod having a nut mounted on one end thereof and which is operable to move the adjustable sections of the leg into clamping relation with the shelves mounted thereon, clamping the shelves to the leg or support.

Another important object of the invention is to provide means for clamping a table top or shelf between movable sections of supporting legs, thereby adapting the clamping means for use in clamping table tops or shelves of various thicknesses and designs.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Figure 1 is a fragmental perspective view of one end of a table, constructed in accordance with the invention.

Figure 2 is an elevational view of a support in the form of a table leg to which shelves are clamped.

Figure 3 is a plan view of the upper end of a table leg.

Figure 4 is a bottom plan view thereof.

Figure 5 is a sectional view taken on line 5—5 of Figure 2.

Figure 6 is a modified form of the invention.

Figure 7 is a section taken on line 7—7 of Figure 6.

Figure 8 is a further modified form of the invention.

Figure 9 is a sectional view taken on line 9—9 of Figure 8.

Figure 10 is a transverse sectional view through a modified form of table leg.

Referring to the drawing in detail, the support, which in the present showing is in the form of a table leg, is indicated generally by the reference character 5 and embodies an outer section 6 which is provided with a dovetail rib 7 which extends from the lower end thereof terminating at a point in spaced relation with the upper end of the support.

At the upper end of the support or leg 5, is the block 8 which is secured in position by means of dowel pins 9, the outer surface of the block being such that it will carry out the general contour of the support 5, as shown by Figure 3.

The lower surface of the block 8 provides a shoulder against which the shelf 10 abuts, the shelf 10 being held in position against the shoulder by means of the bar 11 which is formed with a dovetail groove 12 to receive the dovetail rib 7, when the bar 11 is slid over the outer section in clamping relation with the block 8.

The inner side of the support or leg 5 also includes the bar 13 which is substantially long, as compared with the block 11 and reaches to a point adjacent to the lower end of the support or leg 5. This bar 13 is also provided with a dovetail groove to move over the dovetail rib 7, the bar 13 being slid to a position to clamp the shelf 14 with the lower end of the bar 11, as clearly shown by Fig. 1 of the drawing.

The bar 13 is also provided with a groove 15 extending inwardly from the lower end thereof, the groove being designed to receive the rod 16 which has its upper end disposed substantially at right angles at 17, the right angled end being of a length to extend into the bore 18 formed in the inner surface of the outer section 6. Thus it will be seen that due to this construction, the rod 16 is anchored within the support or leg, with its lower threaded end 19 extended below the lower end of the support or leg 5. As shown, the bars 11 and 13 are of a combined length slightly less than the length of the outer section 6 of the leg, and the space between the lower end of the bar 13 and lower end of the outer section 6 is filled by the spacer blocks 20 having dovetail grooves fitted over the dovetail rib of the bar 11, which blocks are of various thicknesses, so that by removing one of the blocks the space between the adjacent ends of the bars 11 and 13 or the spaces in which the shelves are held, may be varied in width to accommodate shelves of various thicknesses. For example if it should be desired to replace the shelves 10 and 14 with shelves of thicker construction, it would be necessary to remove the two lowermost spacer blocks. The shelves may now be positioned between the bars 11 and 13 and 11 and the block 8 with the result that the lower edge of the adjacent upper spacer block 20 will be moved to a position with its lower surface flush with the lower edge of the section 6. Mounted on the threaded end of the rod 16, is the nut 21, which nut is provided with a knurled surface 21' so that it may be readily rotated to exert pressure against the lower end of the support and spacer block flush with the lower edge of the support or leg, thereby providing means for moving the bars 11 and 13 into clamping relation with respect to each other to clamp the shelves held therein.

In the form of the invention as shown by sheet 2 of the drawings, the table leg which is indicated generally by the reference character 25 embodies an inner section 26 and an outer section 27, the section 26 having a dovetail groove in which the dovetail rib 28 operates. In this form of the invention a bracket 29 in the form of a right angled plate is provided, the right angled plate having openings to receive screws 30 that hold the bracket in clamping relation with respect to the upper end of the section 26, as better shown by Figure 7 of the drawings, to clamp the shelf which, in the present showing, is indicated by the reference character 31. In this form of the invention, a rod not shown, and which corresponds to the rod 16 in Figures 2 and 5 of the drawings, is used at the lower end of the leg, to draw the sections of the leg together in a manner as described.

In the form of the invention as shown by Figures 8 and 9 of the drawings, a bracket indicated by the reference character 32 is provided and comprises a plate having right angled sections, one of the right angled sections having openings to receive the screws 33, while the other right angled section indicated by the reference character 34, is embedded in a groove 34' formed in one edge of the shelf 35. In this formed of the invention, the leg section 36 is provided with a dovetail section 37 that fits in a dovetail groove 37' formed in the adjacent edge of the leg section 38, the sections 37 and 38 being held in contact with each other, by means of a securing rod not shown, and which is disposed at the lower end of the leg, the securing rod being identical with that shown at 16 in Figure 2 of the drawings.

The sectional view as shown by Figure 10 of the drawings clearly illustrates the rod which is indicated by the reference character 39, the rod 39 having a substantially right angled end 40 fitted in an opening in the outer section 27 of the leg. A knurled head not shown, and corresponding to the nut or head 21 as illustrated by Figure 2 of the drawings, is provided on the lower end of the rod 39 and affords means for drawing the sections of the table leg into their proper clamping positions to hold the shelves between the movable sections of the table legs.

From the foregoing it will be seen that due to the construction shown and described, I have provided a furniture piece embodying a plurality of shelves which are clamped between sections of legs which in turn, are secured together by means of adjustable bolts that are interengaged between the sections of the legs of the table.

Having thus described the invention, what is claimed is:

A knock-down shelving support comprising a supporting leg embodying a main supporting section having a bore formed in one surface thereof and having a dovetail rib formed longitudinally of such surface, a plurality of superposed bars having dovetail grooves fitted over said dovetail rib of the main supporting section, a rod extending upwardly from the lower end of said support, said rod having a substantially right angled end fitted in the bore of the main supporting section, the other end of said rod being threaded and extended beyond the end of the main supporting section, shelves, spacer blocks of various thicknesses removably mounted on the main section and engaging one end of one of the bars, and a nut on the threaded end of the rod engaging the lowermost block urging said blocks longitudinally of the main supporting section and forcing the bars into clamping relation with said shelves positioned between the adjacent ends of said blocks, securing the shelves to the support.

References Cited in the file of this patent
UNITED STATES PATENTS

| | | |
|---|---|---|
| 901,152 | Churchill | Oct. 13, 1908 |
| 1,939,904 | Koopman | Dec. 19, 1933 |
| 1,969,957 | Zimmerman | Aug. 14, 1934 |
| 1,989,849 | Davies | Feb. 5, 1935 |
| 2,065,133 | Heppenstall | Dec. 22, 1936 |
| 2,238,226 | Lindgren | Apr. 15, 1941 |
| 2,457,836 | Schofield | Jan. 4, 1949 |
| 2,579,052 | Schofield | Dec. 18, 1951 |